United States Patent [19]

Yamamoto et al.

[11] 4,392,672

[45] Jul. 12, 1983

[54] WEBBING RETRACTOR

[75] Inventors: Toshimasa Yamamoto; Mamoru Mori, both of Okazaki; Eiichi Kinaga, Toyota, all of Japan

[73] Assignees: Toyota Jidosha Kogyo Kabushiki Kaisha; Kabushiki-Kaisha Tokai-Rika-Denki-Seisakusho, both of Aichi, Japan

[21] Appl. No.: 211,454

[22] Filed: Nov. 28, 1980

[30] Foreign Application Priority Data

Nov. 29, 1979 [JP] Japan ............................ 54-165206[U]

[51] Int. Cl.³ ............................................ B60R 21/02
[52] U.S. Cl. .................................... 280/803; 297/479
[58] Field of Search ........................ 280/803, 804, 805; 297/474, 475, 478, 479

[56] References Cited

U.S. PATENT DOCUMENTS

| | | | |
|---|---|---|---|
| 4,083,581 | 4/1978 | Clifford | 280/803 |
| 4,252,342 | 2/1981 | Terabayashi et al. | 280/803 |
| 4,262,933 | 4/1981 | Fox | 280/803 |

*Primary Examiner*—Richard A. Bertsch
*Attorney, Agent, or Firm*—Parkhurst & Oliff

[57] ABSTRACT

A webbing retractor for winding an occupant restraining webbing in an emergency of a vehicle, wherein one end of one of resilient members, which are serially connected to each other, is connected to a takeup shaft, and, when a vehicle door is closed, a locking device is adapted to lock connecting portions of the resilient members, whereby bias of one of the resilient members is prevented from acting on said takeup shaft to lighten a takeup force, thereby relieving the oppressive feeling applied to the occupant.

9 Claims, 6 Drawing Figures

F I G. 5
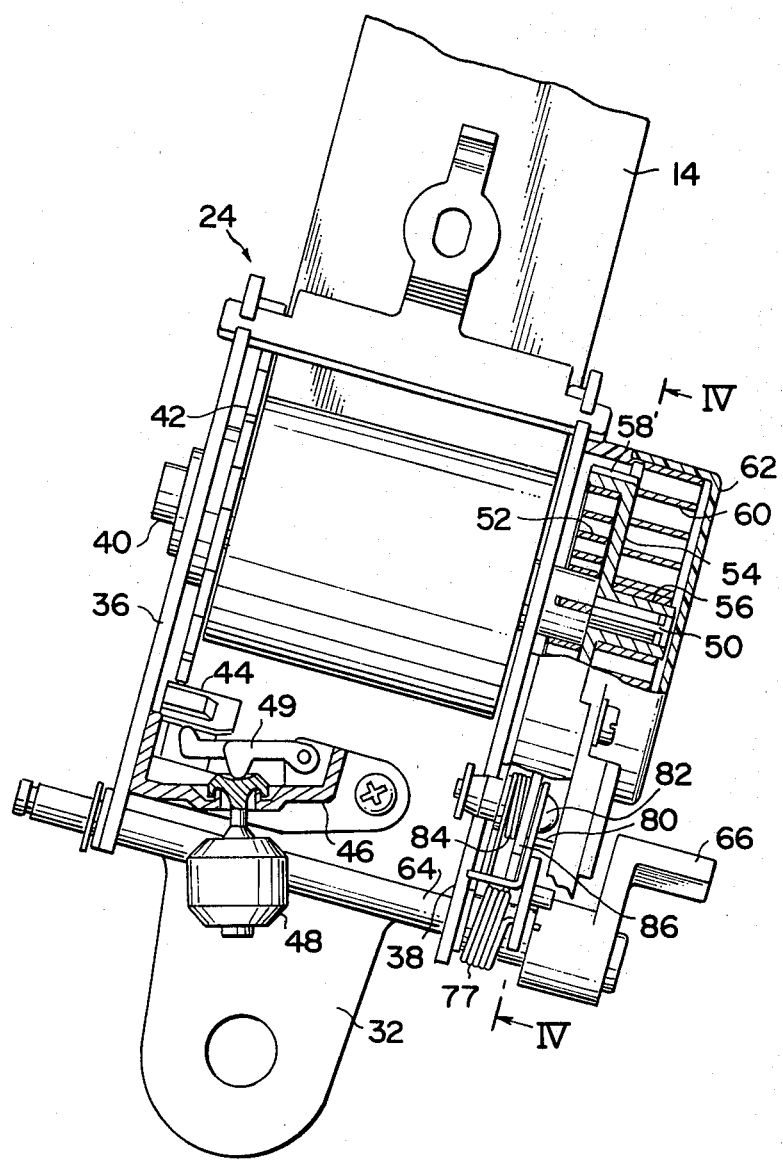

WEBBING RETRACTOR

BACKGROUND OF THE INVENTION

1. Field of the Invention

The present invention relates to a webbing retractor for winding up an occupant restraining webbing for use in a seatbelt system for protecting an occupant in an emergency of a vehicle, and particularly to a webbing retractor intended for decreasing an oppressive feeling imparted to the occupant through the webbing.

2. Description of the Prior Art

In seatbelt systems, consideration has been given to that webbings for restraining an occupant is fastened to the occupant, whereby the occupant is restrained in an emergency of the vehicle, so that the occupant can be protected from colliding with dangerous articles. Furthermore, in the seatbelt system, tension is given to the webbing under a predetermined windup bias in order to closely fasten the webbing to the occupant, and, after the webbing is unfastened from the occupant, the windup bias causes the webbing to be automatically wound into and received in a retractor.

However, the tension of the webbing acts on the body of the occupant as an oppressive feeling, whereby the comfort of the occupant is deteriorated, causing fatigue to the occupant and leading to a decreased proportion of occupants wearing the webbings.

In view of the above, there have been proposed electrical tension decreasing devices for detecting the seated state of the occupant to decrease the tension of the webbing. However, this tension decreasing device requires a sensor, a solenoid and the like for detecting the seated state of the occupant, thereby presenting such a disadvantage that the construction thereof becomes complicated.

SUMMARY OF THE INVENTION

In view of the abovedescribed disadvantages, the present invention has as its object the provision of a webbing retractor capable of decreasing the oppressive feeling acting on the occupant with a simplified construction.

The webbing retractor according to the present invention is of such an arrangement that the connecting portions of a pair of resilient members serially connected to a takeup shaft are engaged with a vehicle door when the door is closed by use of a locking device, and the bias of one of the resilient members is caused to act on the takeup shaft, whereby the tension of the webbings are decreased, thereby relieving the oppressive feeling applied to the body of the occupant.

Description will hereunder be given of an embodiment of the present invention with the accompanying drawings.

BRIEF DESCRIPTION OF THE DRAWINGS

FIG. 5 is a left side view of FIG. 4; and

DESCRIPTION OF THE PREFERRED EMBODIMENT

Figure 1:
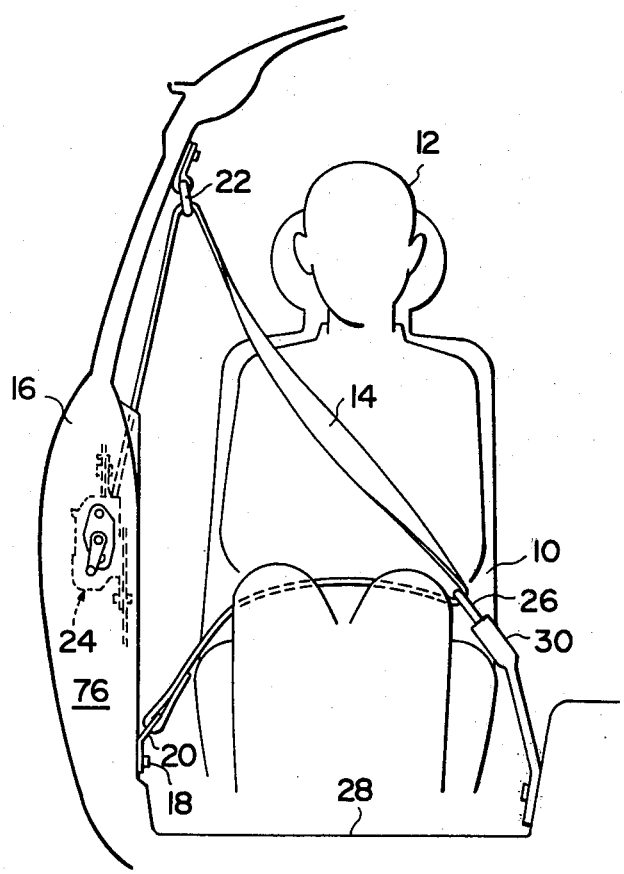
FIG. 1 is a front view showing an embodiment of the webbing retractor according to the present invention as viewed from the front of the vehicle.

In FIG. 1, an occupant 12 seated at a seat 10 in a compartment of the vehicle is brought into a three-point seatbelt fastened condition by use of an occupant restraining webbing 14. More particularly, one end of the occupant restraining webbing 14 is engaged with an anchor plate 20 solidly secured through a bolt 18 to the lower portion of a center pillar 16 of the vehicle, the intermediate portion thereof is turned back at a through ring 22 solidly secured to the upper portion of this center pillar 16, and the other end thereof is wound into a retractor 24 mounted in the center pillar 16. Further, a tongue plate 26 is secured to the intermediate portion of the webbing 14 movably in the longitudinal direction of the webbing 14. Upon being seated at the seat 10, the occupant engages the tongue plate 26 with a buckle device 30 erected from a floor portion 28 at the side opposite to the retractor 24 through the seat 10, whereby, as shown in FIG. 1, a portion of the webbing 14 between the anchor plate 20 and the tongue plate 26 is fastened to a lap of the occupant 12 and a portion of the webbing 14 between the tongue plate 26 and the through ring 22 is fastened to a shoulder of the occupant 12, thus bringing the occupant into the three-point seatbelt fastened condition.

Description will now be given of the retractor 24 with reference to FIGS. 2 through 5. A frame 32 of the retractor 24 is fixed on an inner plate 17 of the center pillar 16 through a plurality of mounting bolts 34, and pivotally supported by legs 36 and 38 which are erected at opposite side portions of the frame 32 is a takeup shaft 40 for winding up one end of the webbing 14 in layers.

In order to properly dispose the webbing 14 on the occupant, the takeup shaft 40 is secured to the center piller 16 with the axis thereof being inclined at a predetermined angle with the center pillar.

Solidly secured to the takeup shaft 40 is a ratchet wheel 42 rotatable with the takeup shaft 40 and opposed to a pawl 44 pivotally supported on the frame 32. Suspended from a bracket 46 projected from the frame 32 is a pendulum 48, and the pawl 44 is rested on the pendulum 48 through a lever 49 pivotally supported on the bracket 46. This pendulum 48 is vertical in its axis during normal running condition of the vehicle as shown in FIG. 5. While, in the case an acceleration of the vehicle acts on the pendulum 48, it tilts to push up the lever 49, whereby the pawl 44 turns to be meshed with the ratchet wheel 42, so that the windout rotation (in the direction indicated by an arrow A in FIG. 4) of the takeup shaft 40 can be prevented.

As shown in FIG. 5, formed at the end portion of the takeup shaft 40 projected from the leg 38 of the frame 32 is a slit 50, with which the inner end of a first spiral spring 52 is engaged. The outer end of this first spiral spring 52 is engaged with the inner side of the ratchet wheel 54.

This ratchet wheel 54 is rotatably, pivotally supported as its boss portion 56 on the end portion of the takeup shaft 40 and a plurality of ratchet gears 58 are notchingly provided on the outer periphery thereof. Engaged at the outer periphery of the boss portion 56 of this ratchet wheel 54 is the inner end of a second spiral spring 60. This second spiral spring 60 is so designed as to be larger in bias than the aforesaid first spiral spring 52 and the outer end thereof is engaged with the inner peripheral portion of a spring cover 62 secured to the outer side of the leg 36.

These first and second spiral springs 52 and 60 are connected to each other in series through the ratchet wheel 54 and bias the takeup shaft 40 in a direction of winding up the webbing (in a direction opposite to the direction indicated by the arrow A).

Figure 3:
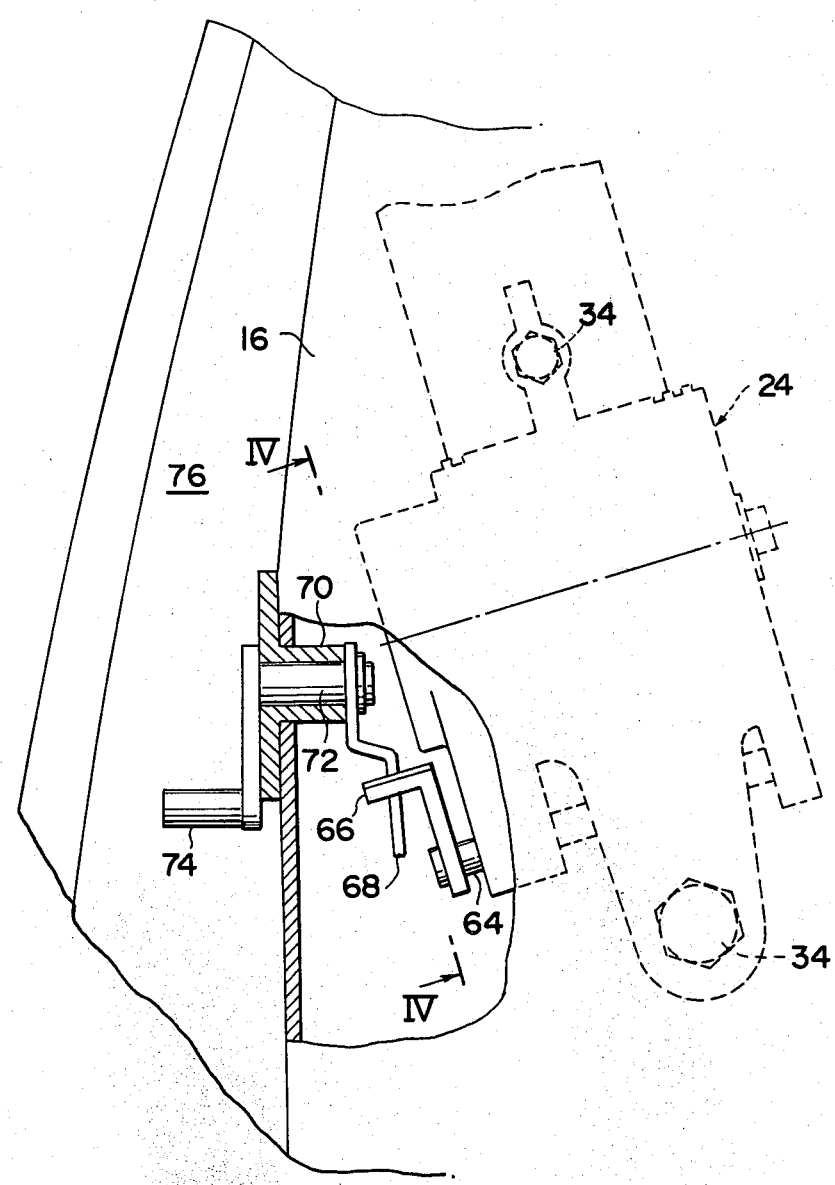
FIG. 3 is a side view of FIG. 2.
Figure 4:
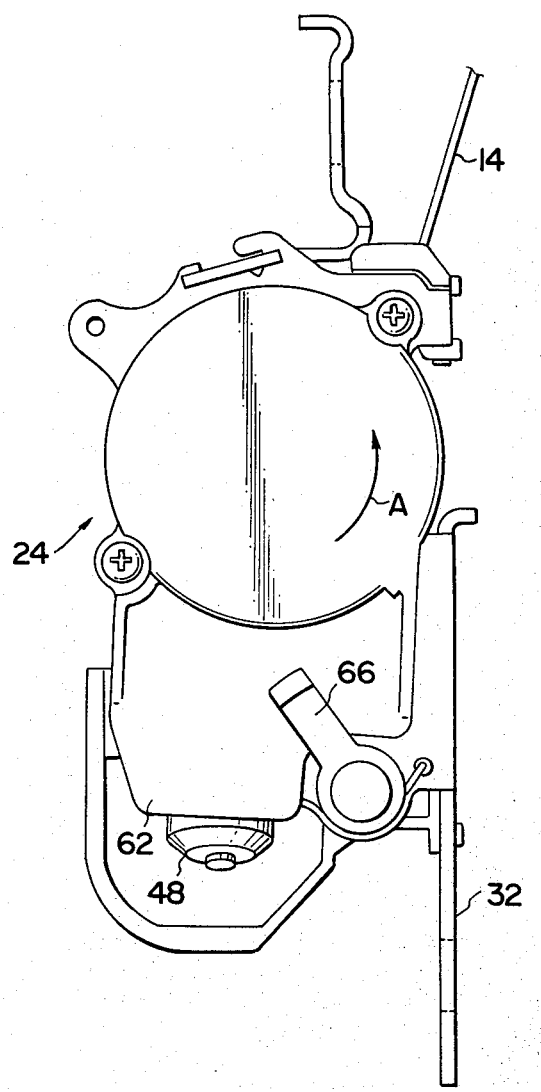
FIG. 4 is a front view of the retractor corresponding to the section taken along the line IV—IV in FIG. 3.

Penetrating through the lower portions of the legs 36 and 38 of the aforesaid frame 32 is a pivot 64, and a lever 66 is pivotally supported on a portion of the pivot 64 disposed outwardly of the leg 38. This lever 66 is bent into a letter 'L' shape, the forward end thereof is directed in the forward direction in the vehicle as shown in FIG. 3 and opposed to a lever 68 pivotally supported on the center pillar 16.

Figure 2:
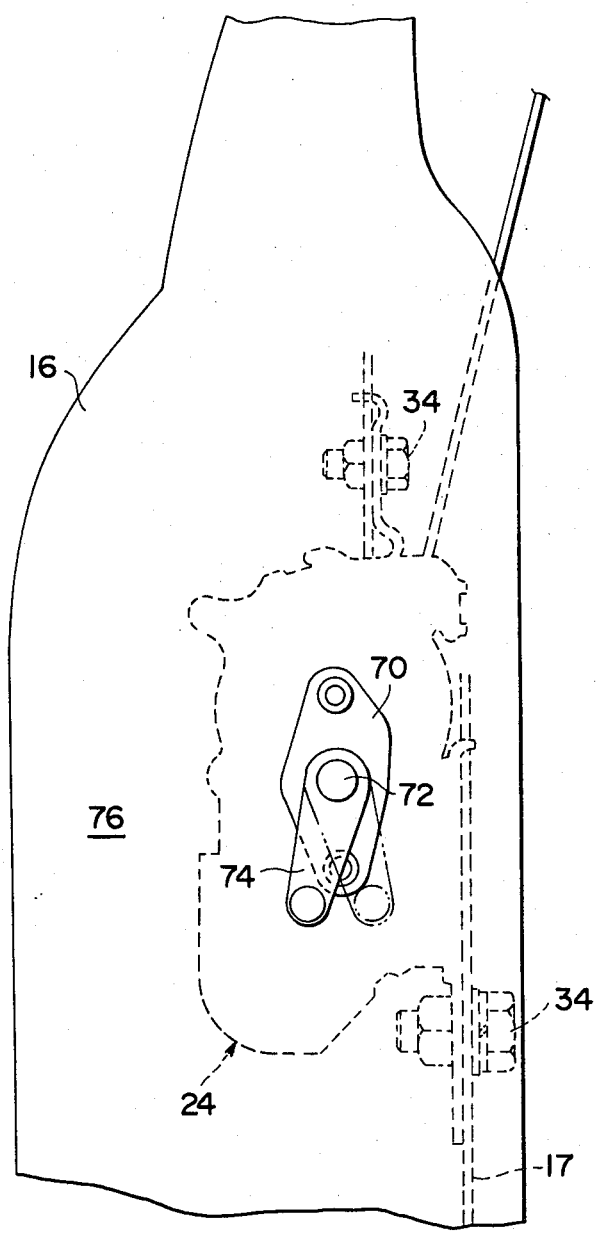
FIG. 2 is a partially enlarged view showing the embodiment of FIG. 1.

This lever 68 is solidly secured to a rotary shaft 72 pivotally supported on a bearing 70 fixed on the center pillar 16 and rotatable with the rotary shaft 72. Solidly secured to the other end of this rotary shaft 72 is a force receiving lever 74 projected into an opening 76 of the door as shown in FIGS. 2 and 3. Consequently, this force receiving lever 74 is disposed within a moving path of the vehicle door (not shown), and, when the door is closed, turned to a position indicated by two-dot chain lines in FIG. 2, whereby the lever 68 turns the lever 66.

Figure 6:
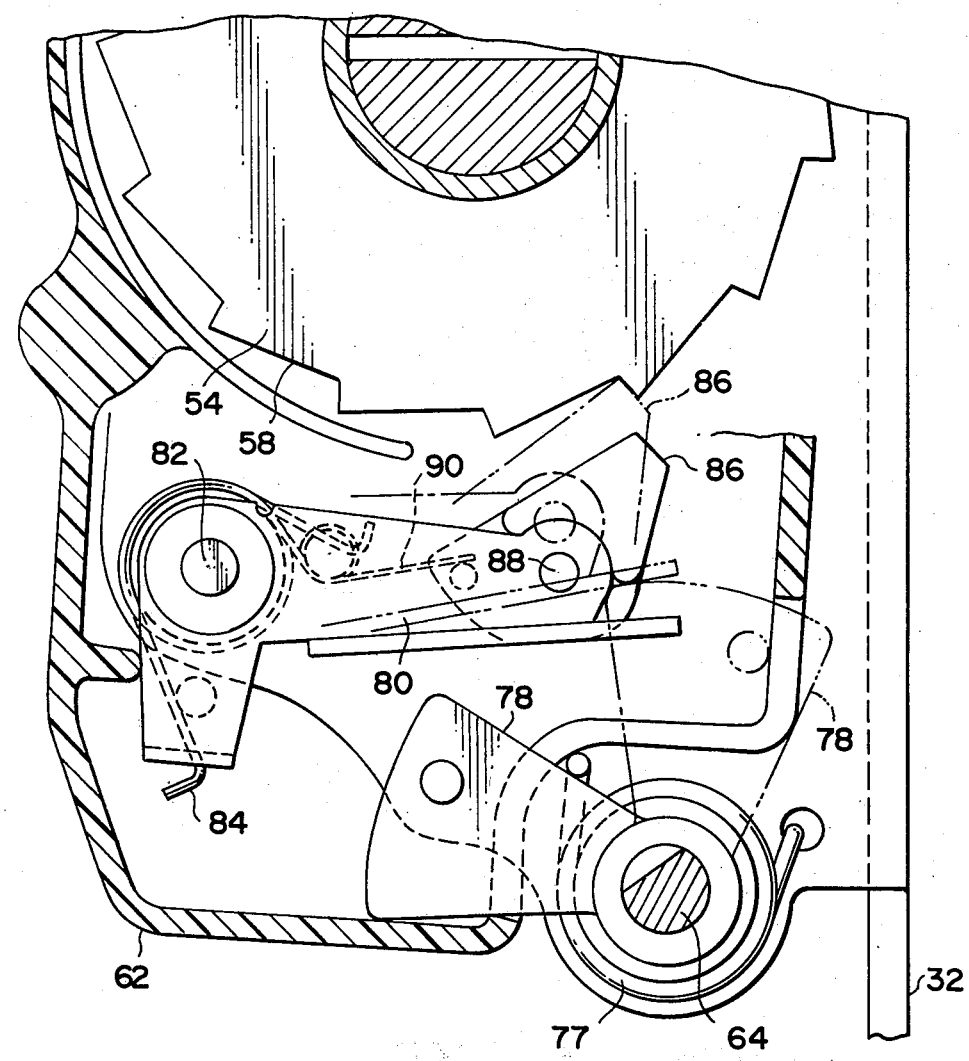
FIG. 6 is an enlarged sectional view taken along the line VI—VI in FIG. 5.

On the other hand, a cam 78 being biased by a torsional coil spring 77 in the counterclockwise direction is fixed on the pivot 64 pivotally supported on the frame 32 at a portion thereof adjacent the leg 38 as shown in FIG. 6 and opposed to a ratchet arm 80. This ratchet arm 80 is pivotally supported on the leg 38 through a pin 82 and adapted to be turned by the bias of a torsional coil spring 84 confined between the leg 38 and itself in the clockwise direction in FIG. 6 to thereby approach the cam 78. However, a portion of the ratchet arm 80 is brought into contact with the spring cover 62 to thereby be separated from the cam 78.

A small pawl 86 is pivotally supported on the forward end of this ratchet arm 80 through a pin 88 and biased to be turned in the counterclockwise direction in FIG. 6 by the bias of a torsional coil spring 90 confined between the ratchet arm 80 and itself. This ratchet arm 80 is turned by the cam 78, whereby the small pawl 86 is meshed with the ratchet gear 58, so that the ratchet wheel 54 can be prevented from rotating in the clockwise direction in FIG. 6. However, the small pawl 86 can be turned about the pin 88 in the clockwise direction, so that the ratchet wheel 54 can turn in the counterclockwise direction by turning the small pawl 86 about the pin 88 in the clockwise direction.

Description will hereunder be given of action of the present embodiment with the abovedescribed arrangement. If the occupant 12 engages the tongue plate 26 with the buckle device 30 upon being seated at the seat 10, then he can be brought into the three-point seatbelt fastened condition by use of the webbing 14 as shown in FIG. 1.

The occupant closes the vehicle door after or before the webbing is fastened to him. At this time of closing, the vehicle door turns the force receiving lever 74 in the counterclockwise direction in FIG. 2, whereby the lever 68 turns the lever 66 in the clockwise direction in FIG. 4, so that the cam 78 turns the ratchet arm 80 in the counterclockwise direction in FIG. 6, thereby meshing the small pawl 86 with the ratchet wheel 54.

With the abovedescribed arrangement, the connecting portions of the serially connected spiral springs 52 and 60 are locked, whereby the bias of the second spiral spring 60 does not act on the takeup shaft 40 and only the bias of the first spiral spring 52 having a weak bias acts on the takeup shaft 40. Consequently, the tension acting on the webbing 14 is considerably low, so that the occupant receives little oppressive feeling.

Furthermore, during normal running condition of the vehicle, the takeup shaft 40 can be wound out against the bias of this first spiral spring 52, so that the occupant can desirably change the driving posture.

Further, the ratchet wheel 14 can turn in the windout direction of the webbing, so that the free movement of the occupant is not disturbed even when the occupant changes his driving posture.

In case the vehicle has fallen into an emergency such as a collision, the pendulum 48 tilts to push up the pawl 44 which comes into meshing engagement with the ratchet wheel 42, whereby the takeup shaft 40 is abruptly prevented from the webbing windout rotation, so that the occupant can be positively restrained, thus securing him in safety.

When the occupant opens the vehicle door after the webbing is unfastened from him upon completion of the normal running of the vehicle, then the ratchet arm 80 is separated from the ratchet wheel 54 in the reverse order of actions, whereby the strong bias of the second spiral spring 60 acts on the takeup shaft 40 again, so that the webbing 14 can be reliably wound into the takeup shaft 40.

As has been described hereinabove, in the webbing retractor according to the present invention, the locking device locks the connecting portions of the pair of resilient members which are serially connected to the takeup shaft when the door is closed, thereby offering such an outstanding advantage that the oppressive feeling given to the occupant can be relieved with a considerably simplified construction.

What is claimed is:

1. A webbing retractor for winding by its bias a webbing to restrain and protect an occupant in an emergency of a vehicle, comprising:
    (a) a takeup shaft for winding the occupant restraining webbing;
    (b) a first and a second resilient members serially connected to said takeup shaft for biasing said takeup shaft in series in the windup direction of said webbing; and
    (c) a locking device for locking the connecting portions of said first and second resilient members when a vehicle door is closed, whereby bias of one of the resilient members is prevented from acting on said takeup shaft, thereby decreasing the oppressive feeling applied to the occupant.

2. A webbing retractor as set forth in claim 1, wherein a frame for pivotally supporting said takeup shaft is secured to a center pillar of the vehicle.

3. A webbing retractor as set forth in claim 2, wherein said first and second resilient members are spiral springs, said first spiral spring is secured at one end thereof to the takeup shaft, and said second spiral spring being stronger in bias than said first spiral spring is secured at one end thereof to said frame.

4. A webbing retractor as set forth in claim 1, wherein said locking device includes a ratchet wheel interposed between the connecting portions of said first and second resilient members and a ratchet arm adapted to be meshed with said ratchet wheel to prevent said ratchet wheel from rotating in the windup direction of the webbing.

5. A webbing retractor as set forth in claim 4, wherein a small pawl pivotally supported at the forward end of said ratchet arm is meshed with said ratchet wheel and rotates relative to said ratchet arm, thereby enabling said ratchet wheel to rotate in the windout direction of the webbing.

6. A webbing retractor as set forth in claim 5, wherein said ratchet arm is actuated by a cam rotatable when the vehicle door is closed to be meshed with said ratchet wheel.

7. A webbing retractor as set forth in claim 6, wherein said cam is interlocked with a force receiving lever which is disposed within a moving path of the vehicle door to operate said ratchet arm through said cam when the vehicle door is closed.

8. A webbing retractor as set forth in claim 6, wherein said cam supporting said takeup shaft is pivotally supported on a frame secured to an inner plate of the center pillar of the vehicle.

9. A webbing retractor for winding an occupant restraining webbing in a seatbelt system for protecting an occupant in an emergency of a vehicle, comprising:
 (a) a frame secured to a center pillar of the vehicle;
 (b) a takeup shaft pivotally supported on said frame for winding one end of said occupant restraining webbing;
 (c) a first spiral spring secured at one end thereof to said takeup shaft;
 (d) a ratchet wheel pivotally supported on said frame and secured thereto with the other end of said first spiral spring;
 (e) a second spiral spring being stronger in bias than said first spiral spring, secured at one end thereof to said ratchet wheel and secured at the other end thereof to said frame; and
 (f) a locking device, part of which is disposed within a moving path of the vehicle door for preventing said ratchet wheel from rotating in the windup direction of the webbing when the vehicle door is closed.

* * * * *